United States Patent [19]

Toyoda et al.

[11] Patent Number: 4,680,520

[45] Date of Patent: Jul. 14, 1987

[54] ZERO-POINT RETURN METHOD

[75] Inventors: Kenichi Toyoda, Hino; Shinsuke Sakakibara, Komae; Haruyuki Ishikawa, Tokyo, all of Japan

[73] Assignee: Fanuc Ltd., Yamanashi, Japan

[21] Appl. No.: 843,697

[22] PCT Filed: Jan. 12, 1985

[86] PCT No.: PCT/JP85/00395

§ 371 Date: Mar. 7, 1986

§ 102e Date: Mar. 7, 1986

[87] PCT Pub. No.: WO86/00728

PCT Pub. Date: Jan. 30, 1986

[30] Foreign Application Priority Data

Jul. 12, 1984 [JP] Japan ................................ 59-144606

[51] Int. Cl.$^4$ ............................................. G05B 11/18
[52] U.S. Cl. ................................... 318/594; 318/592; 318/468
[58] Field of Search ............... 318/592, 593, 594, 595, 318/596, 626, 466, 468; 364/474

[56] References Cited

U.S. PATENT DOCUMENTS

| | | | |
|---|---|---|---|
| 3,953,774 | 4/1976 | Sato et al. ............................ | 318/594 |
| 3,976,929 | 8/1976 | Rodier ................................ | 318/594 |
| 3,995,206 | 11/1976 | Aronstein ....................... | 318/594 X |
| 4,166,970 | 9/1979 | Cardot .............................. | 318/594 |
| 4,225,928 | 9/1980 | Ohkubo ......................... | 318/594 X |
| 4,312,033 | 1/1982 | Sweeney et al. ............... | 318/594 X |
| 4,513,234 | 4/1985 | Nozawa et al. ................. | 318/592 X |

Primary Examiner—Benjamin Dobeck
Attorney, Agent, or Firm—Staas & Halsey

[57] ABSTRACT

A method of returning a movable machine element having a flat dog to a zero point includes advancing the movable machine element in the direction of the flat dog, stopping the movable machine element after a changeover signal ($S_D$) produced by the flat dog is detected, reversing the direction of the movable machine element, moving the movable machine element a first predetermined distance (L) and stopping it after the changeover signal ($S_D$) is received again, then moving the movable machine element in the opposite direction a second predetermined distance (l) shorter than the first predetermined distance (L) and stopping the movable machine element, thereafter moving the movable machine element at a low velocity and stopping it at an initial one-revolution signal of a servomotor, which operates the movable machine element, after the changeover signal produced by the flat dog is detected.

2 Claims, 4 Drawing Figures

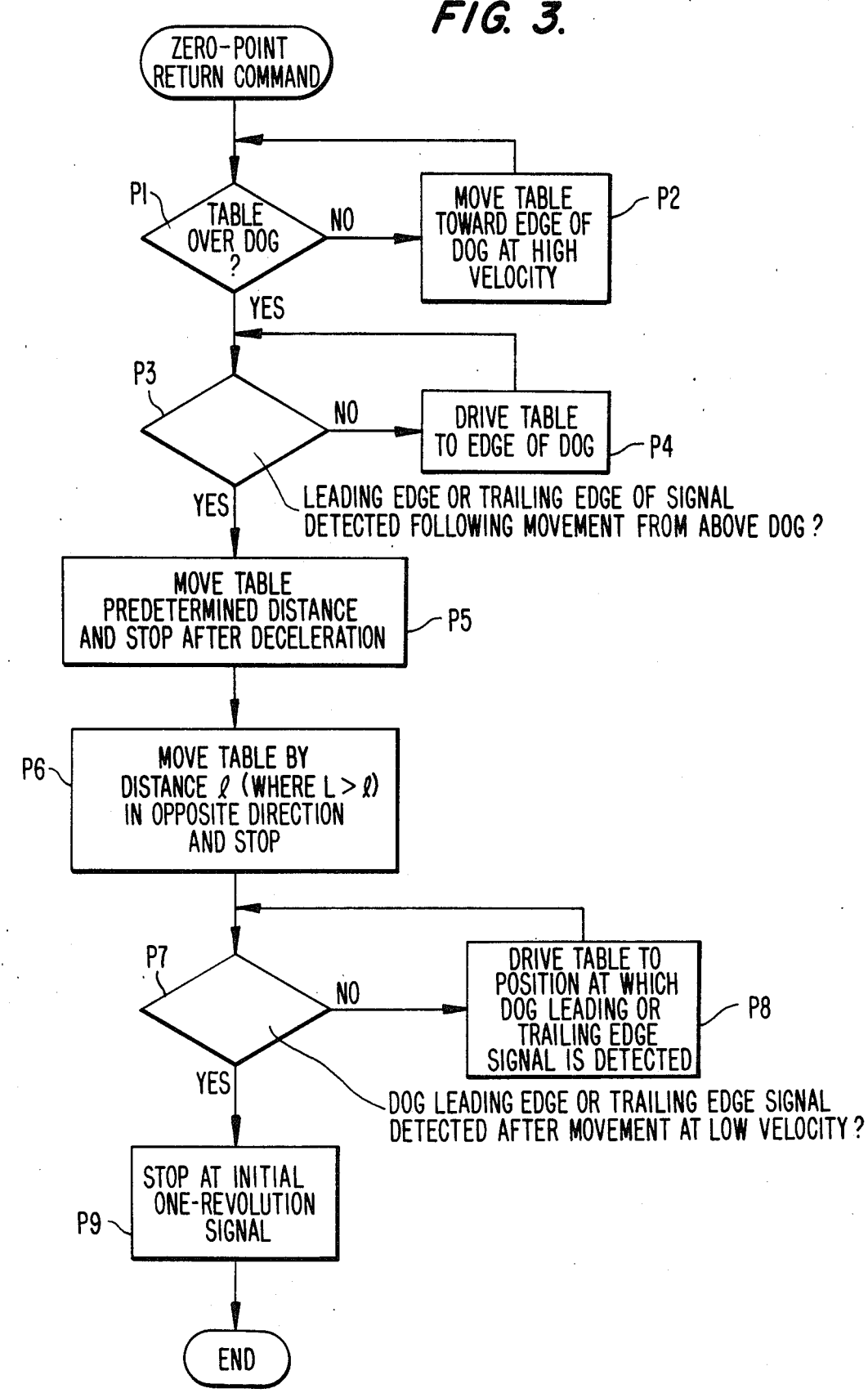

ZERO-POINT RETURN METHOD

DESCRIPTION

1. Technical Field

This invention relates to a method of returning a movable element of a machine to a zero point and, more particularly, to a zero-point return method applied to a movable element of a machine such as machine tool controlled by a numerical control unit.

2. Background Art

A method shown in FIGS. 1(a), (b) is generally employed in the prior art to return, to a zero point, a movable machine element such as the table of a machine tool controlled by a numerical control unit. Specifically, in the conventional method, a dog DG for zero-point return is provided on a movable machine element (table) TB and a deceleration limit switch DLS is provided in the vicinity of a zero point of a fixed machine part MC. When the numerical control unit controlling the machine is set to a zero-point return mode, the movable element (table) TB is moved toward the zero point at a rapid-traverse velocity $V_R$. The movable machine element (table) TB arrives in the vicinity of the zero point and the dog DG actuates the deceleration limit switch DLS at a time $t_1$ [FIG. 1(a)], whereupon a deceleration signal XDL goes to "1" as shown in FIG. 1 (a). In response to the leading edge of the deceleration signal XDL, the numerical control unit lowers the velocity at which the return to the zero point is carried out so that the velocity reaches zero as shown by the dashed line after a predetermined time (at time $t_2$) or reaches a velocity $V_L$ at which the motor can be stopped instantaneously, as shown by the solid line. Thereafter, the movable machine element TB is moved toward the zero point at the velocity $V_L$. At time $t_3$, the dog DG separates from the decelerating limit switch DLS so that the limit switch is restored and the deceleration signal reverts to "0". Since the numerical control unit considers the first grid position (a position, described below, at which a grid signal GRS is generated) encountered since restoration of the limit switch to be the zero point, the movable machine element is stopped at time $t_4$ (grid position $G_0$) to complete the zero-point return operation. Let us now explain the grid positions. FIG. 1(b) is a view for describing grid positions. A servomotor is provided with a pulse coder which generally produces one pulse of a position signal per revolution of the servomotor. Specifically, let one revolution of the pulse coder be equivalent to movement L (mm) of the movable element, and plot the position of the movable element along the horizontal axis, as shown in FIG. 1(b). In such case, the movable element will generate one position signal GRS per amount of movement L (mm). The points $G_0, G_1, G_2, G_3 \ldots$ at which the position signal GRS is generated are referred to as grid points.

With a system that uses the leading and trailing edges of a single dog as a deceleration dog and zero-point position dog, as in the case of the zero-point return dog DG shown in FIG. 1(a), it is difficult to judge the direction in which the table will initially operate when zero-point return is started. In other words, it is difficult to judge on which side the table is located with respect to the dog. Though a mechanical zero-point return method has been practiced using two dogs, namely a deceleration dog and a zero-point position dog, the problem with this method is the same as that encountered with the method shown in FIG. 1(a).

Use of a flat dog has been proposed in order to eliminate the difficulty encountered in judging the operating direction of a table at the time of a zero-point return operation. The term "flat dog" used herein refers to a dog capable of indicating only an on signal or off signal state. The dog can possess only one point at which a signal makes an on/off changeover in a stroke. Judging the operating direction of a table at the time of a zero-point return operation is facilitated by using such a dog that possesses only one point at which a signal makes an on/off changeover in a stroke.

However, since a flat dog has only one point at which a signal makes an on/off changeover in a stroke, it is difficult to perform the two control operations of deceleration and zero-point return. Though this problem can be solved if two flat dogs for deceleration and zero-point position are used, disposing two dogs on an actual machine tool or the like presents problems in terms of space. Accordingly, the state of the art is such that when a flat dog is used, zero-point return is practiced without deceleration. With the flat dog method, therefore, a shift in the zero-point position can occur due to an overlooked one-revolution signal from the pulse coder or due to chattering of the limit switch caused by the dog acting upon the lever of the limit switch without being decelerated.

The present invention has been devised to solve the aforementioned problems of the prior art and its object is to provide a zero-point return method which effectively utilizes the advantage of the flat dog, namely the ability to judge on which side of the dog the movable machine element is located, and yet which makes deceleration control possible to return the movable machine element to the zero-point position in a precise manner.

DISCLOSURE OF THE INVENTION

According to the present invention, there is provided a zero-point return method in which a control unit for controlling a servomotor operating a movable machine element controls a zero-point return operation of the movable machine element based on a changeover signal produced by a flat dog, the method including:

(a) a first step in which the control unit moves the movable machine element a first predetermined distance and then stops the movable machine element when the changeover signal produced by the flat dog is detected;

(b) a second step in which, after the first step ends, the control unit moves the movable machine element a second predetermined distance smaller than the first predetermined distance in a direction opposite to that of the first step and then stops the movable machine element; and (c) a third step in which, after the second step ends, the control unit moves the movable machine element at a low velocity in a direction the same as that of the second step and stops the movable machine element at a first rotation signal of the servomotor after the changeover signal produced by the flat dog is detected.

According to the present invention, use is made of the advantage possessed by the flat dog, namely the ability to judge on which side of the flat dog the movable machine element is located. In addition, the leading and trailing edges of the changeover signal produced by the flat dog are detected at a low velocity, after which the one-revolution signal of the servomotor is received and the movement of the movable machine element halted to effect the return to the zero point. Accordingly, the following advantages are obtained:

(1) The movable machine element can be zero-point returned to the correct position at all times without any shift in the zero-point position caused by a missed one-revolution signal of the servomotor.

(2) It is possible to prevent chattering of the limit switch caused by the flat dog acting upon the lever of the limit switch without being decelerated. A shift in the zero-point position caused by such chattering can be prevented before it occurs.

(3) The return to the correct zero-point position can be carried out through a simple arrangement.

Other objects and features of the present invention will become clear from the description to follow.

BRIEF DESCRIPTION OF THE DRAWINGS

FIG. 3 is an operation flowchart of the zero-point return method according to the present invention.

BEST MODE FOR CARRYING OUT THE INVENTION

The present invention will now be described in detail based on an illustrated embodiment.

Figure 1A:
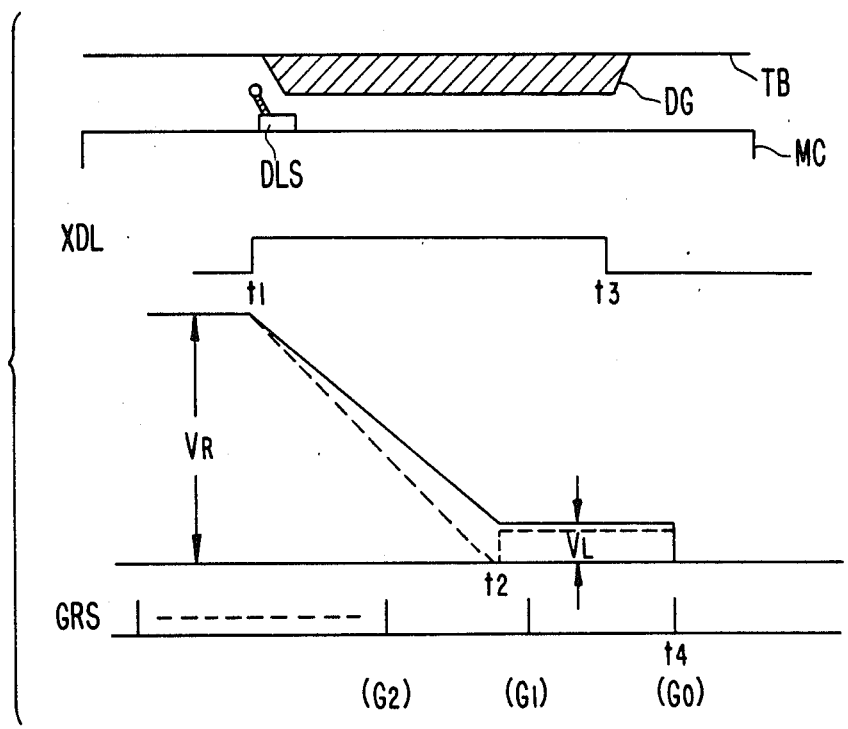
FIGS. 1(a), (b) are schematic views for describing the principle of returning a table to a zero point.
Figure 1B:
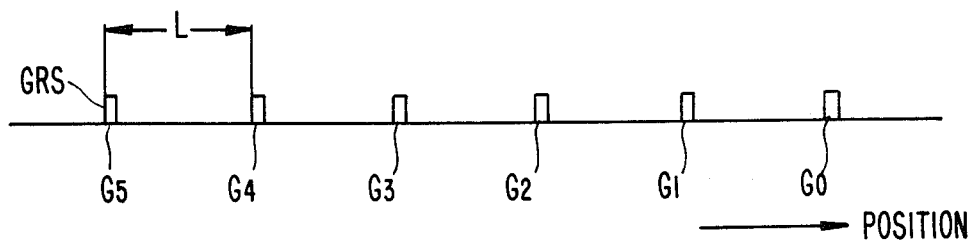
Figure 2:
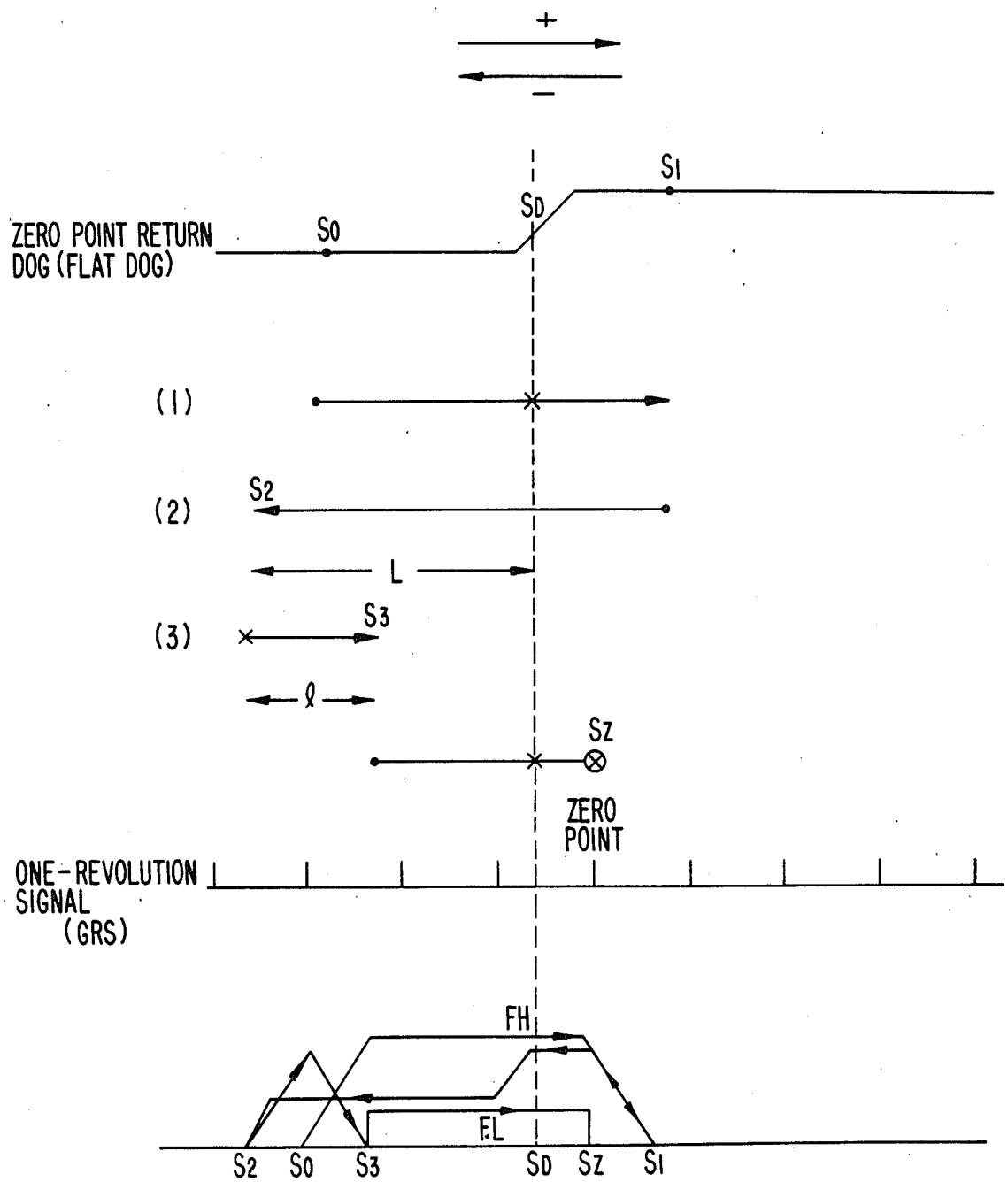
FIG. 2 is a view for describing a zero-point return method according to the present invention.

FIG. 2 is a view for describing a zero-point return method according to the present invention using a flat dog, and FIG. 3 is a flowchart for describing the operation. The zero-point return method of the present invention will be described step by step using these drawings.

The method will be described for a case where a zero-point return command is issued when the table position is a point $S_o$.

(1) A control unit determines whether the table TB is over the dog (P1). When the table position is the point $S_o$, the table is not over the flat dog. Accordingly, the control unit moves the table toward the edge of the flat dog at a high velocity FH (P2).

(2) Owing to movement of the table via the foregoing steps (P1), (P2), the table TB strikes the flat dog. The control unit determines whether the table has moved to a point $S_D$, at which the leading and trailing edges of a signal from the flat dog are detected. In other words, the control unit checks the changeover of a signal from the limit switch actuated by the flat dog (P3), (P4).

(3) When the detection point $S_D$ is passed, the table is decelerated and subsequently reaches a first predetermined point $S_1$, after which movement is reversed to cause the table to traverse the detection point $S_D$. The table is subsequently stopped at a point $S_2$ after having been moved a predetermined distance L from $S_D$ (P5).

(4) Next, the control unit moves the table to a point $S_3$ in the opposite direction by a second predetermined distance l smaller than the predetermined distance L, after which the table is stopped (P6).

(5) The control unit then moves the table at a low velocity FL, after which the leading or trailing edge signal of the flat dog is detected at the zero point $S_D$ (P7), (P8).

(6) After this signal is detected, the control unit stops movement of the table at the first one-revolution signal GRS obtained from the pulse coder (not shown) (P9). The position at which the table is stopped is the zero-point position $S_X$.

If the zero-point return command is issued when the table position is over the dog, the program jumps from step P1 to step P3 of the flowchart shown in FIG. 3, after which the table is returned to the zero point through an operation the same as that described above. Thus, prior to its return to the zero point, the table is slowed to a low velocity at the steps P7, P8 so that it can be stopped smoothly at the zero point.

Though the present invention has been described based on the illustrated embodiment, the invention is not limited to this embodiment but can be modified in various ways in accordance with the gist of the present invention, such modifications being within the scope of the invention.

INDUSTRIAL APPLICABILITY

Thus, the zero-point return method according to the present invention effectively utilizes the advantage of the flat dog, namely the ability to judge on which side of the dog the movable machine element is located, and makes deceleration control possible to return the movable machine element to the correct zero-point position. Accordingly, the invention is well-suited for application to a numerically controlled machine tool which is to be accurately controlled.

We claim:

1. A zero-point return method in which a control unit for controlling a servomotor operating a movable machine element controls a zero-point return operation of the movable machine element based on a changeover signal produced by a flat dog, the method including:
   (a) a first step in which the control unit stops the movable machine element when the changeover signal produced by said flat dog is detected, thereafter reverses the movable machine element and, after again receiving the changeover signal, moves the movable machine element a first predetermined distance and stops the movable machine element;
   (b) a second step in which, after the first step ends, the control unit moves the movable machine element a second predetermined distance smaller than said first predetermined distance toward a changeover signal detection point and stops the movable machine element; and
   (c) a third step in which, after the second step ends, the control unit moves the movable machine element in a direction the same as that of the second step and stops the movable machine element at a first rotation signal of the servomotor after the changeover signal produced by said is detected.

2. A zero-point return method in which a control unit for controlling a servomotor operating a movable machine element controls a zero-point return operation of the movable machine element based on a changeover signal produced by a flat dog, the method including:
   (a) a first step in which, when the movable machine element is not located over the flat dog at issuance of a zero-point return command, the control unit moves the movable machine element at a high-velocity rank in a direction to actuate the flat dog and stops movement of the movable machine element when the changeover signal produced by the flat dog is detected;
   (b) a second step in which, after the first step ends, the control unit moves the movable machine element in a direction opposite to that of the first step, switches over to a deceleration mode when the changeover signal produced by said flat dog is detected and then moves the movable machine element a first predetermined distance and stops the movable machine element;

(c) a third step in which, after the second step ends, the control unit moves the movable machine element a second predetermined distance smaller than said first predetermined distance in a direction opposite to that of the second step and then stops the movable machine element; and (d) a fourth step in which, after the third step ends, the control unit moves the movable machine element at a low velocity rank lower than the high-velocity rank in a direction the same as that of the third step and stops the movable machine element at a first rotation signal of the servomotor after the changeover signal produced by said flat dog is detected.

* * * * *

UNITED STATES PATENT AND TRADEMARK OFFICE
CERTIFICATE OF CORRECTION

PATENT NO. : 4,680,520
DATED : July 14, 1987
INVENTOR(S) : Kenichi Toyoda et al

It is certified that error appears in the above-identified patent and that said Letters Patent is hereby corrected as shown below:

On the title page assignee should read

--(73) Assignee: Funuc Ltd., Minamitsuru-Gun, Yamanashi, Japan --.

(57) Abstract, line 11, "1" should read -- $\ell$ --.

Column 3, line 58, "1" should read -- $\ell$ --.

Signed and Sealed this

Tenth Day of May, 1988

Attest:

DONALD J. QUIGG

Attesting Officer

Commissioner of Patents and Trademarks